United States Patent Office 3,255,178
Patented June 7, 1966

3,255,178
METHYL 3,4-O-ISOPROPYLIDENETHIOLIN-COSAMINIDE
William Schroeder, Pavilion Township, Kalamazoo County, Mich., assignor to The Upjohn Company, Kalamazoo, Mich., a corporation of Delaware
No Drawing. Filed Apr. 13, 1964, Ser. No. 359,486
1 Claim. (Cl. 260—210)

The present invention relates to a novel compound and is more particularly concerned with methyl 3,4-O-isopropylidenethiolincosaminide [methyl 6-amino-6,8-dideoxy-3.4 - O - isopropylidene - 1-thio-D-erythro-D-galacto-octopyranoside] and a method for the preparation thereof.

The novel compounds of this invention and the process for the production thereof can be illustratively represented in the following manner:

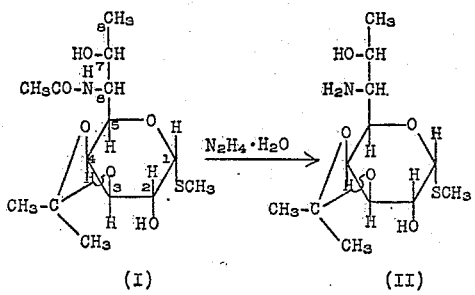

The process of the present invention comprises: treating methyl N-acetyl - 3,4 - O-isopropylidenethiolincosaminide (I) with hydrazine hydrate to obtain methyl 3,4-O-isopropylidenethiolincosaminide (II).

The novel compound, methyl 3,4-O-isopropylidenethiolincosaminide, is highly active against *Trichophyton rubrum, Pseudomonas fluorescens*, and other human pathogenic microorganisms. The antimicrobial activity of this novel product can be utilized for washing equipment in hospitals, homes, and microbiological laboratories, and for washing medical and surgical instruments as well as clothing used in laboratories and the like. Also, in such locations where sterile backgrounds are necessary, floors, walls and ceilings can be washed with an aqueous solution of this compound.

The starting material, methyl N-acetyl-3,4-O-isopropylidenethiolincosaminide, is novel; its synthesis is shown in the preparations.

In carrying out the process of the novel invention, methyl N-acetyl-3,4-O-isopropylidenethiolincosaminide is refluxed between 1 and 48 hours in an excess of hydrazine hydrate. In the preferred embodiment of this invention the time of reflux is generally between 12 and 36 hours. Thereafter the excess hydrazine is removed by distillation, usually in a nitrogen stream or in vacuo. The remaining crystalline material is purified by recrystallization from water, methanol, ethanol, or the like.

The following preparations and examples are illustrative of the process and products of the present invention, but are not to be construed as limiting.

PREPARATION 1

*Methyl thiolincosaminide*

A solution of 4 g. of lincomycin [U.S. Patent 3,086,-912] in 20 ml. of hydrazine hydrate (98–100%) was refluxed for 21 hours; excess hydrazine hydrate was then removed in vacuo under nitrogen at steam bath temperature. The residue, a pasty mass of crystals, was cooled, acetonitrile was added, and the mixture was stirred until the crystals were suspended. The crystals were collected on a filter, washed with acetonitrile and with ether. The yield of white, crystalline methyl thiolincosaminide after drying in vacuo at room temperature was 2.1 g. (84%). Recrystallization was accomplished by dissolving the methyl thiolincosaminide in hot dimethyl formamide and adding an equal volume of ethylene glycol dimethyl ether.

Methyl thiolincosaminide has a melting point of 225–228° C., an optical rotation of $[\alpha]_D^{25} +276°$ (c.=0.768 in water), and a pKa' of 7.45.

*Analysis.*—Calcd. for $C_9H_{19}NO_5S$: C, 42.7; H, 7.56; N, 5.53; S, 12.66. Found: C, 42.6; H, 7.49; N, 5.75; S, 12.38.

PREPARATION 2

*Methyl N-acetylthiolincosaminide*

Five grams of methyl thiolincosaminide (about 0.02 mole) was suspended with stirring in 50 ml. of methanol and treated with 4.04 g. (about 0.04 mole) of acetic anhydride. The starting material dissolved almost completely, and thereafter the mixture became thick with crystals. After 18 hours at room temperature (about 25° C.), the solid was filtered, washed with methanol, and dried in a vacuum oven at 50° C. and 15 mm. pressure; yield, 4.58 g. (79%) of crystalline product melting at 242–245° C. This product was recrystallized from absolute methanol to give colorless needles of methyl N-acetylthiolincosaminide having a melting point of 243–245° C. and a rotation, $[\alpha]_D = +265°$ (c.=0.7374, water); and $[\alpha]_D = +248°$ (c.=0.6124, ethanol).

*Analysis.*—Calcd. for $C_{11}H_{21}O_6NS$: C, 44.72; H, 7.17; N, 4.74; S, 10.85. Found: C, 44.87; H, 7.10; N, 4.65; S, 10.99.

In the manner shown in Preparation 2, other acyl derivatives of methyl thiolincosaminide can be made, using other anhydrides such as propionic anhydride, butyric anhydride, valeric anhydride, hexanoic anhydride, benzoic anhydride, phenylacetic anhydride, and phenylpropionic anhydride, and the like. Representative methyl N-acylthiolincosaminides thus obtained include methyl N-propionyl-, N-butyryl-, N-valeryl-, N-hexanoyl-, N-benzoyl-, N-phenylacetyl-, N-phenylpropionythiolincosaminide, and the like.

PREPARATION 3

*Methyl N-acetyl-3,4-O-isopropylidenethiolincosaminide*

A suspension of 5.3 g. of finely powdered methyl N-acetylthiolincosaminide was stirred for 60 hours at room temperature with 500 ml. of acetone and 0.5 ml. of concentrated sulfuric acid. Most of the starting material was still undissolved at this time, so an additional 5 ml. of concentrated sulfuric acid was added; solution quickly resulted. The solution was stirred for 30 minutes at room temperature and added to a suspension of 150 g. of barium carbonate in 100 ml. of water. The mixture was stirred until neutral, barium sulfate and excess barium carbonate were removed by filtration, and the precipitate was washed with acetone. The filtrate and washings were combined and evaporated to dryness in vacuo at 50° C. The residue was treated with acetone-ether (10:1) and insoluble materials were removed by filtration. The filtrate was evaporated to dryness and the residue was dissolved in 100 ml. of ethanol. Removal of the alcohol by heating in vacuo left a yellow gum which was dissolved in 20 ml. of warm water containing a small amount of sodium carbonate. Some insoluble material was removed by filtration and the filtrate was cooled. The crystals which formed were collected after standing in the refrigerator for 4 hours, washed with cold water and dried in vacuo; yield of methyl N-acetyl-3,4-O- isopropylidenethiolincosaminide, 2 g. A portion of the crystals, recrystallized from water for analysis, had a melting point of 174–175° C. and a rotation of $[\alpha]_D^{25}$ +189° (c.=0.4136, water).

*Analysis.*—Calcd. for $C_{14}H_{25}NO_6S$: C, 50.2; H, 7.52; N, 4.17; S, 9.55. Found: C, 48.87; H, 7.46; N, 4.11; S, 9.56.

In the manner given in Preparation 3, other methyl N-acyl - 3,4 - O-isopropylidenethiolincosaminides are prepared by reacting methyl N-acylthiolincosaminides, wherein acyl is propionyl, butyryl, valeryl, hexanoyl, benzoyl, phenylacetyl, phenylpropionyl or the like, with acetone. Representative products thus obtained include:

Methyl N-propionyl-3,4-O-isopropylidenethiolincosaminide,
Methyl N-butyryl-3,4-O-isopropylidenethiolincosaminide,
Methyl N-valeryl-3,4-O-isopropylidenethiolincosaminide,
Methyl N-hexanoyl-3,4-O-isopropylidenethiolincosaminide,
Methyl N-benzoyl-3,4-O-isopropylidenethiolincosaminide,
Methyl N-phenylacetyl-3,4-O-isopropylidenethiolincosaminide,
Methyl N-phenylpropionyl-3,4-O-isopropylidenethiolincosaminide,
and the like.

EXAMPLE 1

*Methyl 3,4-O-isopropylidenethiolincosaminide (II)*

A solution of 1 g. of methyl N-acetyl-3,4-O-isopropylidenethiolincosaminide in 10 ml. of hydrazine hydrate was refluxed for 24 hours. Excess hydrazine was then removed in a stream of dry nitrogen on a steam bath. The crystalline residue was recrystallized from 5 ml. of water, the crystals were collected, washed with cold water, and dried in vacuo; yield, 450 mg. of methyl 3,4-O-isopropylidenethiolincosaminide which after recrystallization from ethanol had a melting point of 177–178° C., a rotation of $[\alpha]_D^{25}=+186°$ (c.=0.689 in water), and the following analysis:

*Analysis.*—Calcd. for $C_{12}H_{23}NO_5S$: C, 49.2; H, 7.9; N, 4.78; S, 10.91. Found: C, 49.27; H, 8.0; N, 5.01; S, 10.92.

EXAMPLE 2

*Methyl 3,4-O-isopropylidenethiolincosaminide*

Without isolating intermediates, the novel compound, methyl 3,4 - O - isopropylidenethiolincosaminide, can be prepared from methyl thiolincosaminide (Preparation 1) as follows:

To a stirred suspension of 20 g. of methylthiolincosaminide in 400 ml. of methanol was added 20 ml. of acetic anhydride. Solution resulted in a few minutes and then crystals of the N-acetyl derivative started to separate. The reaction mixture was cooled in a refrigerator for 1 hour, and the crystals were collected on a filter, washed with methanol, and dried in vacuo overnight; yield, 19.3 g. of methyl N-acetyl-thiolincosaminide. This material was finely powdered, suspended in 1500 ml. of acetone, and while stirred treated with 15 ml. of concentrated sulfuric acid, and stirred for 1 hour at room temperature. The resulting solution was cooled in a refrigerator for an hour and a slight excess of ammonia gas was passed into it to neutralize the sulfuric acid. The ammonium sulfate was removed by filtration, and the solids were washed with acetone. The colorless filtrate which resulted and the washings were combined and evaporated to give methyl N-acetyl-3,4-O-isopropylidenethiolincosaminide as a frothy, gum-like material. This crude material was dissolved in 210 ml. of hydrazine hydrate; the crystals which started to form dissolved on heating. The resulting solution was refluxed for 23 hours and excess hydrazine was then removed in vacuo on a steam bath. The residue was dissolved in ethanol and some insoluble material was removed by filtration. Removal of the ethanol in vacuo left a crystalline residue which was slurried with 50 ml. of acetonitrile. The crystals were collected, washed with acetonitrile and with ether, and dried in vacuo; yield, 12.35 g. of methyl 3,4-O-isopropylidenethiolincosaminide. The filtrate, upon evaporation, afforded another gram of crude material; total yield of methyl 3,4 - O-isopropylidenethiolincosaminide, 13.35 g. (57.5%).

In the manner given in Example 1, other methyl N-acyl-3,4-O-isopropylidenthiolincosaminides can be used to produce methyl 3,4 - O - isopropylidenethiolincosaminide. Other starting materials which can be used in this reaction include Methyl N-propionyl-3,4-O-isopropylidenethiolincosaminide,
Methyl N-butyryl-3,4-O-isopropylidenethiolincosaminide,
Methyl N-valeryl-3,4-O-isopropylidenethiolincosaminide,
Methyl N-hexanoyl-3,4-O-isopropylidenethiolincosaminide,
Methyl N-benzoyl-3,4-O-isopropylidenethiolincosaminide,
Methyl N-phenylacetyl-3,4-O-isopropylidenethiolincosaminide,
Methyl N-phenylpropionyl-3,4-O-isopropylidenethiolincosaminide,
and the like.

I claim:
Methyl 3,4 - O-isopropylidenethiolincosaminide of the formula:

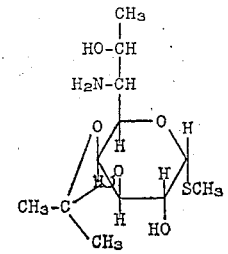

References Cited by the Examiner

UNITED STATES PATENTS 2,827,453  3/1958  Baker et al. _____ 260—210

LEWIS GOTTS, *Primary Examiner.*
JOHNNIE R. BROWN, *Assistant Examiner.*